United States Patent
Holscher et al.

(10) Patent No.: US 9,650,795 B2
(45) Date of Patent: May 16, 2017

(54) WIND POWER PLANT HAVING A FIRE PROTECTION MODULE FOR A TRANSFORMER IN THE TOWER

(71) Applicant: Wobben Properties GmbH, Aurich (DE)

(72) Inventors: Norbert Holscher, Aurich (DE); Mischa Braske, Emden (DE)

(73) Assignee: Wobben Properties GmbH, Aurich (DE)

( * ) Notice: Subject to any disclaimer, the term of this patent is extended or adjusted under 35 U.S.C. 154(b) by 126 days.

(21) Appl. No.: 14/469,219

(22) Filed: Aug. 26, 2014

(65) Prior Publication Data

US 2014/0361548 A1   Dec. 11, 2014

Related U.S. Application Data (63) Continuation-in-part of application No. PCT/EP2013/053061, filed on Feb. 15, 2013.

(30) Foreign Application Priority Data

Feb. 28, 2012 (DE) ........................ 10 2012 202 979

(51) Int. Cl.

| | | |
|---|---|---|
| *E04H 1/12* | (2006.01) | |
| *E04H 12/00* | (2006.01) | |
| *F03D 9/00* | (2016.01) | |
| *F03D 80/00* | (2016.01) | |
| *F03D 80/80* | (2016.01) | |
| *F03D 13/20* | (2016.01) | |

(52) U.S. Cl.
CPC .......... *E04H 1/1261* (2013.01); *E04H 12/00* (2013.01); *F03D 9/002* (2013.01); *F03D 13/22* (2016.05); *F03D 80/00* (2016.05); *F03D 80/82* (2016.05); *F05B 2240/14* (2013.01); *F05B 2240/912* (2013.01); *F05B 2260/231* (2013.01); *Y02E 10/728* (2013.01); *Y02P 70/523* (2015.11)

(58) Field of Classification Search
CPC ......... F03D 9/002; F03D 9/005; Y02E 10/723
USPC .................................................... 290/44, 55
See application file for complete search history.

(56) References Cited

U.S. PATENT DOCUMENTS

| | | | | |
|---|---|---|---|---|
| 2,717,275 A | * | 9/1955 | Hayden | .................... H02B 7/06 174/37 |
| 5,499,482 A | * | 3/1996 | Goff | ........................ E04G 23/00 405/230 |
| 6,678,139 B1 | * | 1/2004 | Greuter | .................. H02G 15/06 361/117 |
| 8,416,042 B2 | | 4/2013 | Schwaiger | |
| 2007/0296220 A1 | * | 12/2007 | Kristensen | .............. F03D 1/001 290/55 |

(Continued)

FOREIGN PATENT DOCUMENTS

| | | |
|---|---|---|
| CN | 1745248 A | 3/2006 |
| CN | 102165539 A | 8/2011 |

(Continued)

*Primary Examiner* — Tulsidas C Patel
*Assistant Examiner* — Charles Reid, Jr.
(74) *Attorney, Agent, or Firm* — Seed IP Law Group LLP (57) ABSTRACT

The invention relates to a wind power plant having a tower that has at least one bottom tower segment and a pre-manufactured fire protection module for fireproof receiving of a transformer. The fire protection module is placed within the bottom tower segment.

11 Claims, 8 Drawing Sheets

(56) References Cited

U.S. PATENT DOCUMENTS

| | | | |
|---|---|---|---|
| 2008/0143118 A1* | 6/2008 | Wobben | F03D 1/001 290/55 |
| 2009/0211172 A1* | 8/2009 | Scholte-Wassink | F03D 1/001 52/40 |
| 2009/0293372 A1* | 12/2009 | Lyness | F03D 1/001 52/40 |
| 2010/0135792 A1 | 6/2010 | Niehues | |
| 2010/0308596 A1* | 12/2010 | Gawrisch | F03D 11/00 290/55 |
| 2011/0221554 A1* | 9/2011 | Schwaiger | F03D 11/00 336/60 |
| 2013/0058070 A1* | 3/2013 | Gaard | F03D 11/0058 361/836 |

FOREIGN PATENT DOCUMENTS

| | | | | |
|---|---|---|---|---|
| DE | 103 10 036 A1 | 8/2004 | | |
| DE | 10 2008 035 350 A1 | 2/2010 | | |
| DE | EP 2278160 A1 * | 1/2011 | ............ | F03D 1/001 |
| EP | 2 278 160 A1 | 1/2011 | | |
| JP | 5-91637 A | 4/1993 | | |
| JP | 11-75319 A | 3/1999 | | |
| JP | 2008-245430 A | 10/2008 | | |
| JP | 2011-530185 A | 12/2011 | | |
| RU | 2024783 C1 | 12/1994 | | |
| RU | 2247438 C2 | 2/2005 | | |
| WO | 2010/015651 A1 | 2/2010 | | |

* cited by examiner

WIND POWER PLANT HAVING A FIRE PROTECTION MODULE FOR A TRANSFORMER IN THE TOWER

BACKGROUND

Technical Field

The present invention concerns a wind power installation.

Description of the Related Art

A wind power installation typically has in the lower region of the pylon or around the pylon a power cabinet having a converter and a transformer. The power cabinets and the transformers need suitable fire protection.

The German Patent and Trade Mark Office in the application from which priority is claimed searched DE 103 10 036 A1.

BRIEF SUMMARY

One or more embodiments of the present invention is to provide a wind power installation having improved fire protection.

One embodiment provides a wind power installation comprising a pylon having at least one lower pylon segment and a previously manufactured fire protection module for receiving a transformer in fire-resistant relationship. The fire protection module is placed within the lower pylon segment.

The fire protection module serves to limit a fire which has occurred in the module at least for a time, within the module. In that way it is possible to provide that the module is thermally decoupled at least at times from the rest of the wind power installation.

In an aspect of the present invention the fire protection module has a first opening for the service personnel and a second opening for replacement of the transformer.

In a further aspect of the invention the fire protection module has at least one fire protection termination means for electric cables and/or an electric bus bar system.

In a further aspect of the invention the fire protection module has a transformer transport rail system for replacement of the transformer.

In a further aspect of the invention the fire protection module has a transport securing system for securing the transformer during a transport operation.

The fire protection module is preferably made from concrete and is preferably produced in the form of a precast concrete component.

Thus there is provided a wind power installation having a pylon, wherein provided in the region of the pylon is a previously manufactured fire protection module for accommodating a transformer, wherein openings or doors in the module can be closed in such a way that the required fire protection can be ensured.

The module is in particular in the form of a fire protection module and serves to accommodate a transformer. The transformer has an output voltage of greater than 1000 volts, that is to say a medium voltage. The fire protection module optionally has two doors which are fire-protected. The doors can also optionally be pressure-resistant so that they still hold up in the case of an explosion in the interior of the fire protection module. The fire protection module is preferably previously manufactured in the factory together with the transformer and is transported as a unit to the location for erection. The fire protection module preferably has a door for service personnel and a door for replacement of the transformer. A rail system for replacement of the transformer can be provided in the fire protection module. The rail system can have a transformer transport securing means which is activated upon transport of the fire protection module. Optionally the fire protection module can have an oil sump beneath the transformer.

Additionally or alternatively to the transformer an electronic power unit can be provided in the fire protection module.

Further configurations of the invention are subject-matter of the appendant claims.

BRIEF DESCRIPTION OF THE SEVERAL VIEWS OF THE DRAWINGS

Advantages and embodiments by way of example are described in greater detail hereinafter with reference to the drawings.

DETAILED DESCRIPTION

Figure 1:
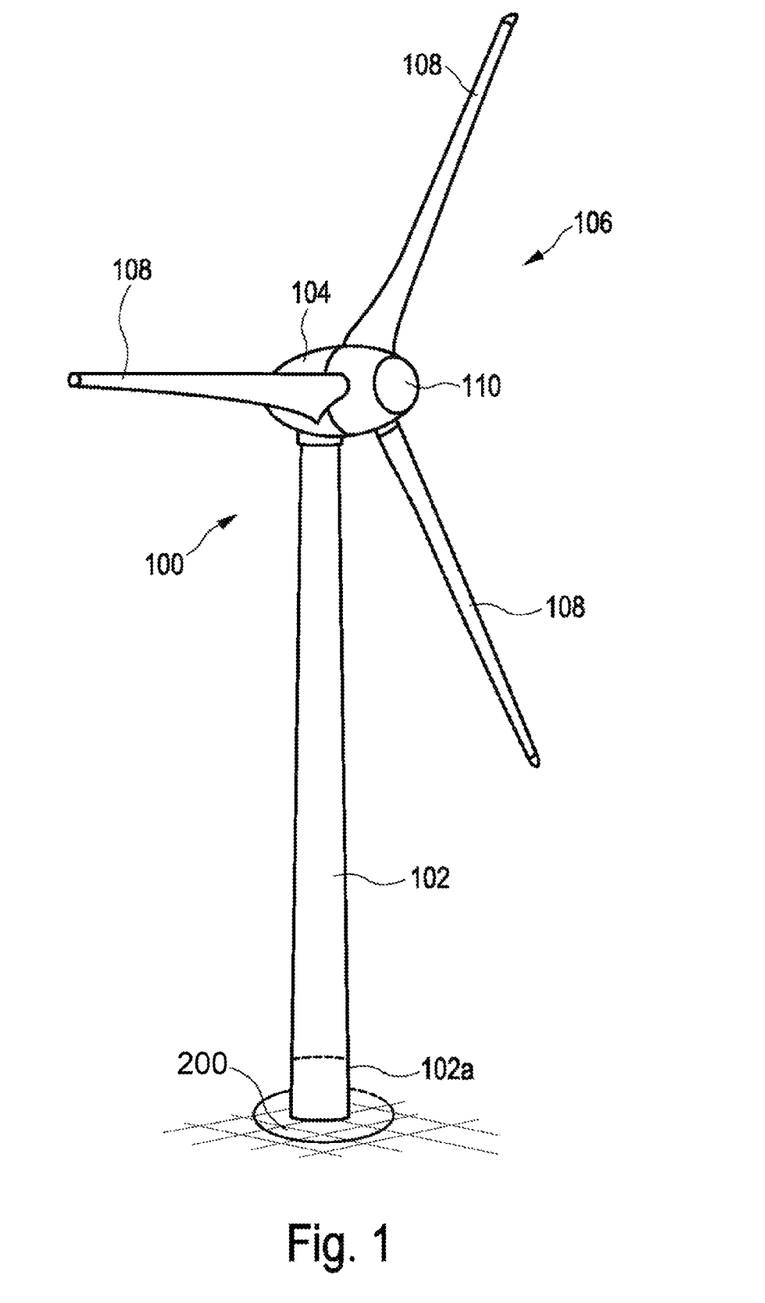
FIG. 1 shows a perspective view of a wind power installation according to one embodiment of the invention, FIGS. 2A to 2D respectively show various views of a lower portion of a pylon of a wind power installation as shown in FIG. 1, FIGS. 3 and 4 each show a diagrammatic sectional view of a fire protection module according to one embodiment of the invention, FIGS. 5 and 6 each show a sectional view of a fire protection module according to one embodiment of the invention.

FIG. 1 shows a wind power installation 100 comprising a pylon 102 (with a lower pylon segment 102a) and a pod 104. Arranged on the pod 104 is a rotor 106 with, for example, three rotor blades 108 and a spinner 110. In operation the rotor 106 is caused to rotate by the wind and thereby drives an electric generator in the pod 104 to generate electric energy. The pylon 102 with the lower pylon segment 102a stands on a foundation 200.

Figure 2A:
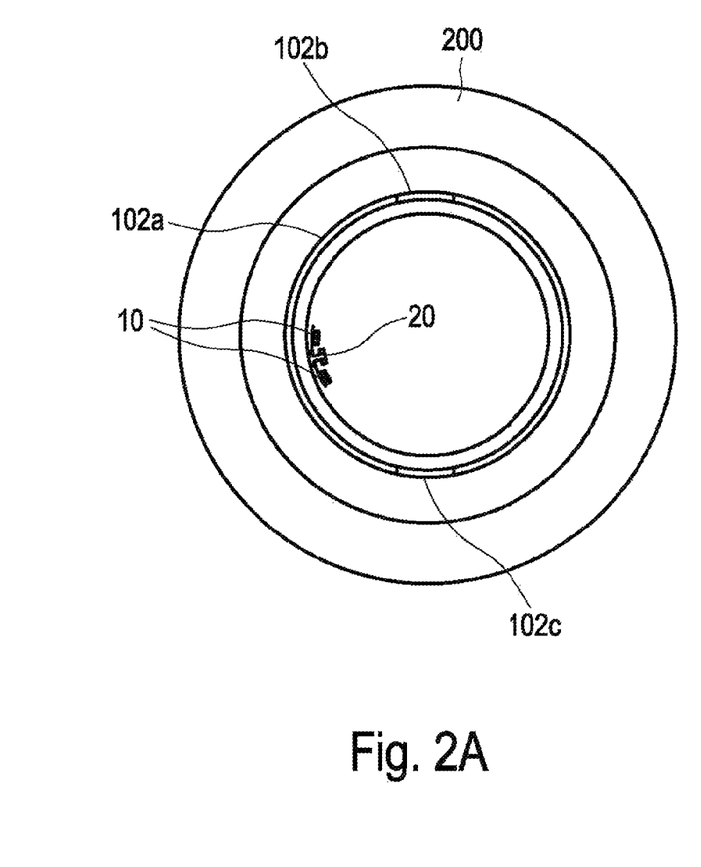
Figure 2B:
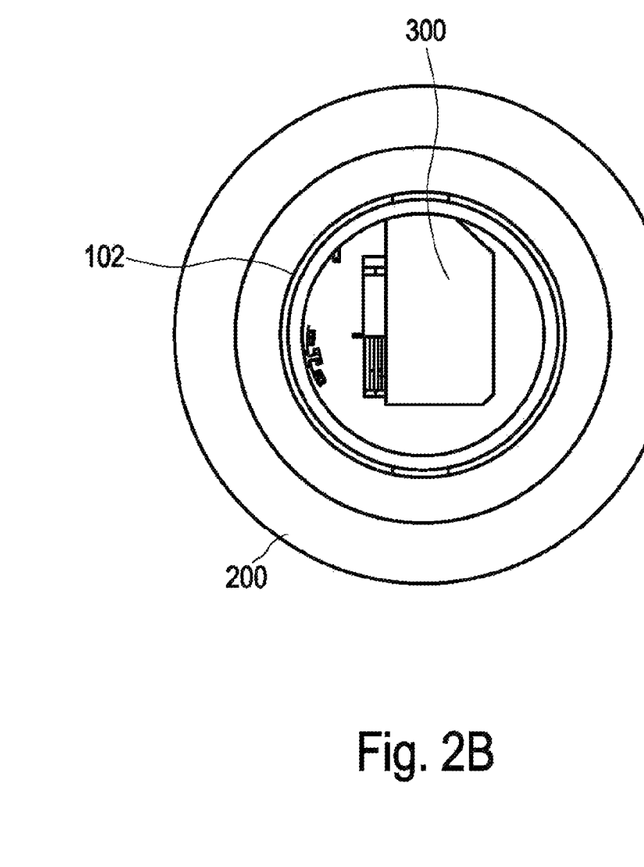
Figure 2C:
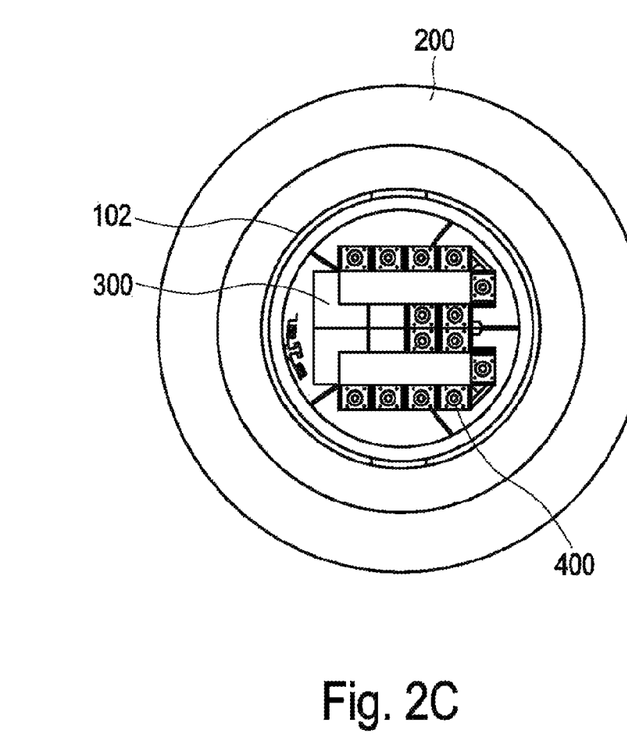

FIGS. 2A to 2D show various diagrammatic views of the lower portion of a pylon of a wind power installation according to FIG. 1. The lower pylon segment 102a of a pylon 102 of a wind power installation 100 is provided on a (concrete) foundation 200. The lower pylon segment 102a can have a first and a second door 102b, 102c as well as cables 10 and a ladder 20 as best shown in FIG. 2A. A fire protection module 300 can be provided in the interior of the lower pylon segment 102 as best shown in FIG. 2B. Various power cabinets 400 can be provided on the roof of the fire protection module 300 as best shown in FIG. 2C. The power cabinets 400 can have at least one converter and further electronic power units.

Figure 2D:
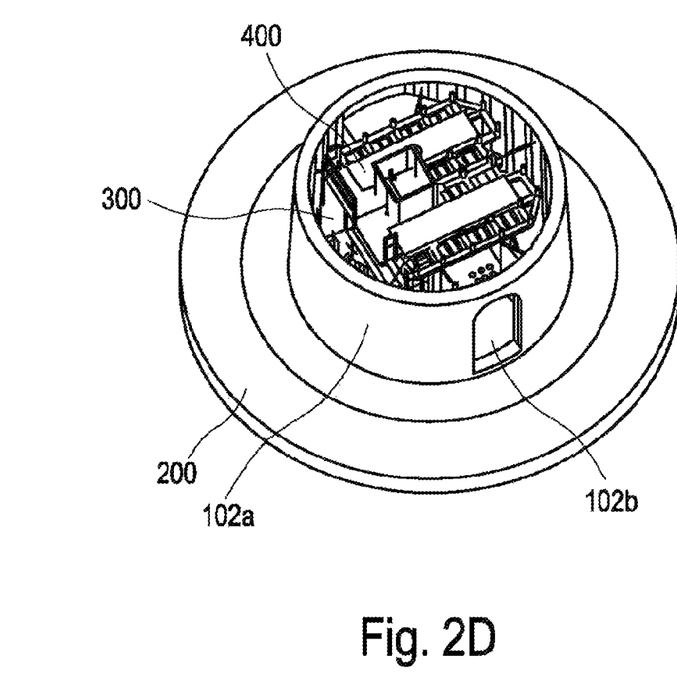

FIG. 2D shows a perspective view of the lower pylon segment of the wind power installation. The lower segment 102a of the pylon of the wind power installation is provided on a foundation 200 and has a first and a second door 102b, 102c. A fire protection module 300 is provided in the interior of the lower pylon segment 102a. Power cabinets 400 with converters and further electronic power units can be provided on the roof of the fire protection module.

Figure 3:
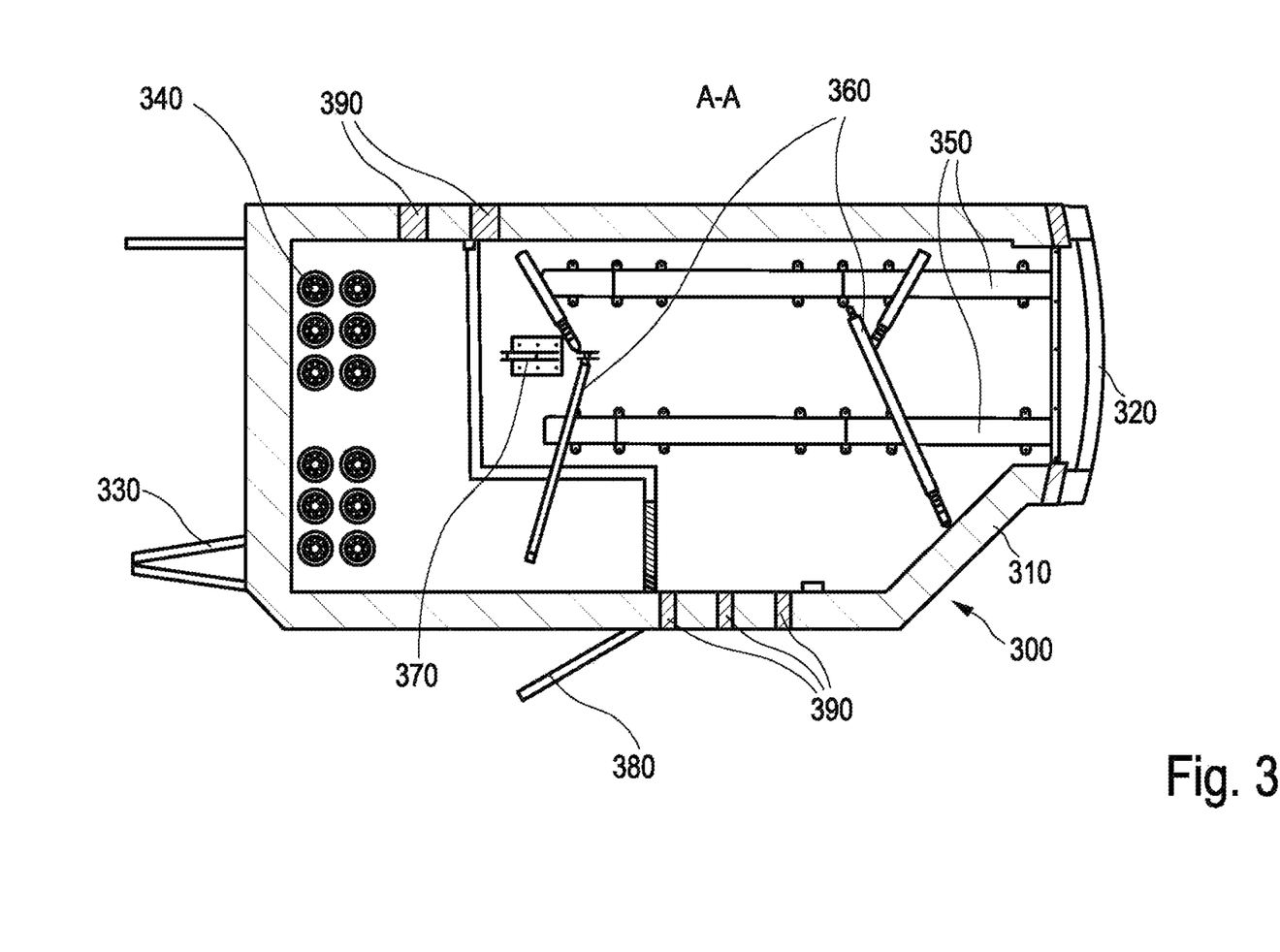

FIG. 3 shows a diagrammatic view of a fire protection module according to one embodiment. The fire protection module 300 has a first and a second door 320, 330. The first door 320 can be used to replace a transformer disposed in the fire protection module 300. The second door 330 can be used by the service personnel to access the switching installation in the fire protection module 300. At its bottom the fire protection module 300 optionally has transformer guide rails 350, a deflection roller 370 and transformer transport securing means 360. A plurality of fire protection termination means 390 can also be provided in the walls of the fire protection module. The fire protection termination means 390, such as the through holes shown in FIG. 3, serve to provide an opening for providing an electric connection between the interior and the exterior of the fire protection module 300. The transformer guide rails 350 serve to provide that a transformer can be moved along the rails, for example, for replacement thereof. The transformer transport securing means 360, such as the locking devices, may be fixed to the transformer 500 during transport of the fire protection module 300.

Figure 4:
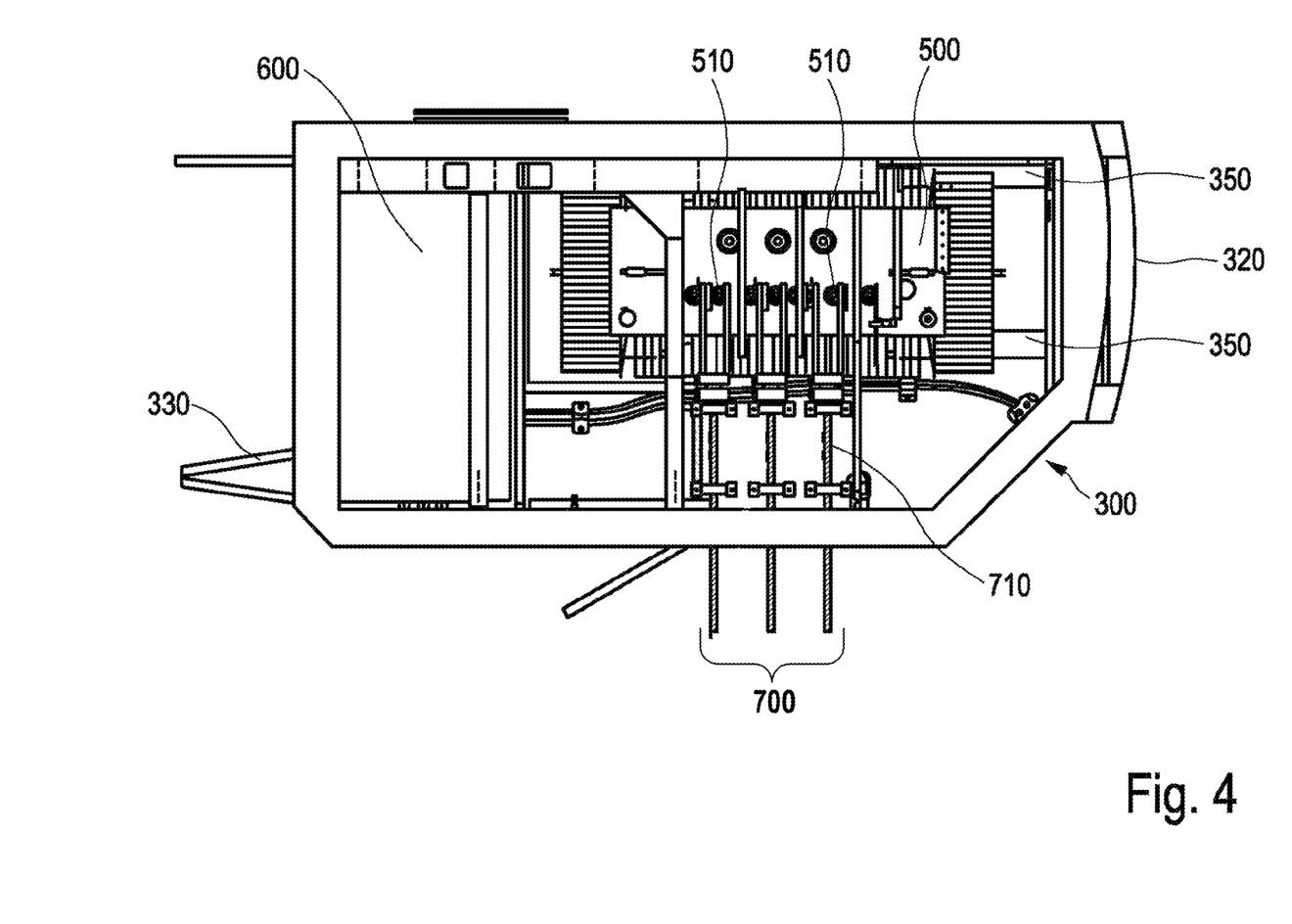

FIG. 4 shows a diagrammatic view of the fire protection module 300 together with a transformer 500 in accordance with a second embodiment of the invention. The transformer 500 is placed on the rails 350. The transformer 500 has a plurality of electric connections 510 which are respectively electrically coupled to a first end 710 of a bus bar system 700.

A first and a second door 320, 330 are provided within the fire protection module 300, wherein the transformer 500 can be dismantled or is transported away through the first door 320.

Figure 5:
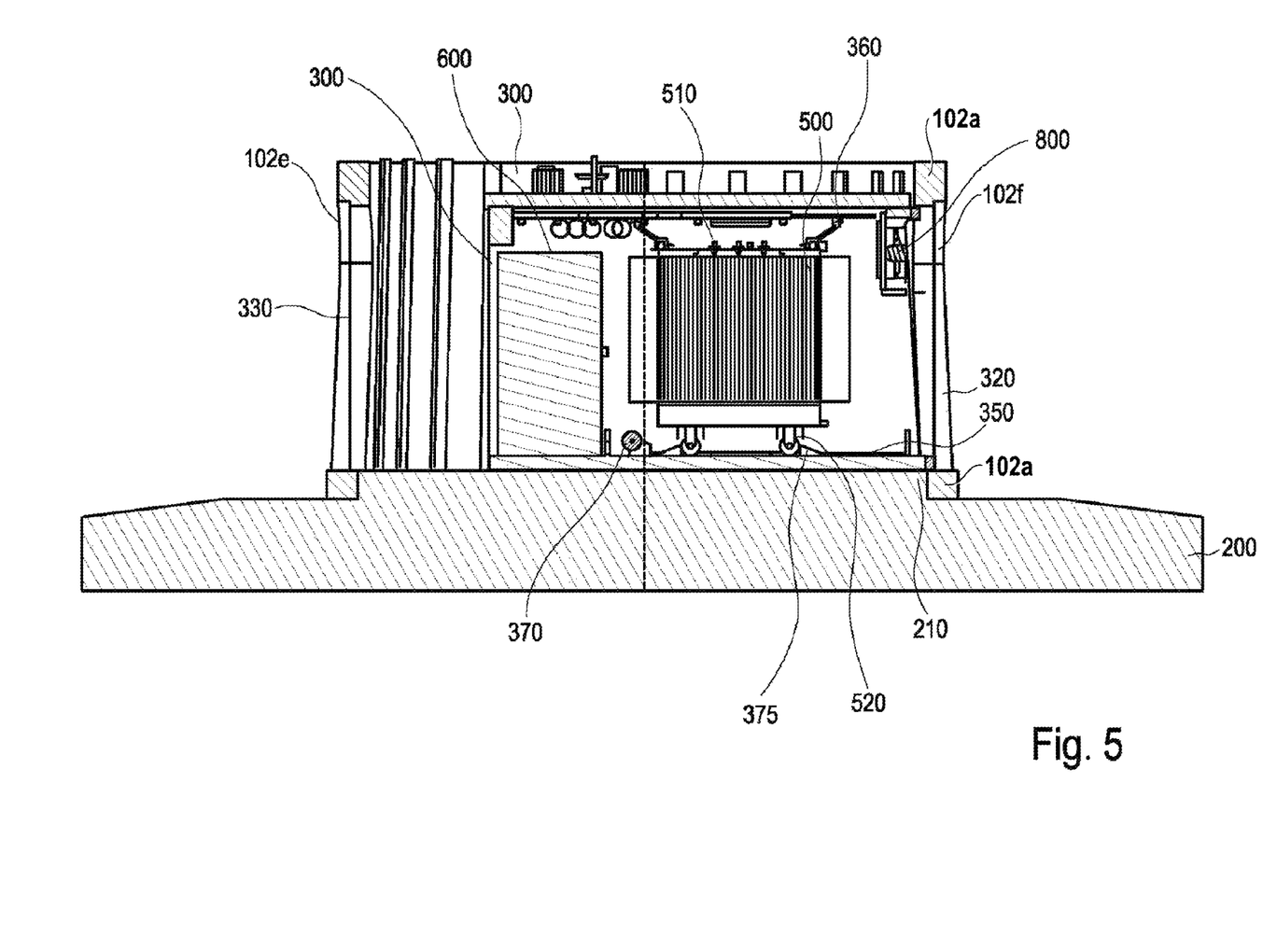

FIG. 5 shows a sectional view of a lower end of a pylon of a wind power installation with a fire protection module according to a third embodiment which can be based on the first or second embodiment. The lower end 102*a* of a lower pylon segment 102 is placed on a foundation 200. Two openings 102*e* and 102*f* are provided in the lower pylon segment 102*a*. The first opening 102*f* serves to be able to transport a transformer 500 therethrough and the second opening 102*e* serves for access by service personnel. The fire protection module 300 can be placed on an upper end 210 of the foundation 200. The fire protection module 300 can have a first and a second door 320, 330, a transformer guide rail 350, a deflection roller 370 and optionally a transformer rolling locking means 375, such as a stopper as shown in FIG. 5. A transformer 500 is placed on the rail system 350. The transformer can be held by way of the transformer securing means 360 during transport thereof.

Optionally the transformer rolling locking means 375 can be mounted fixedly (except upon transport). The transformer can be pulled into the interior of the fire protection module by means of a deflection roller 370 and a corresponding cable.

A switching installation 600 is also provided in the fire protection module 300.

The fire protection module 300 can optionally have a fan 800 which sucks in feed air for transformer cooling and discharges warm air again.

Figure 6:
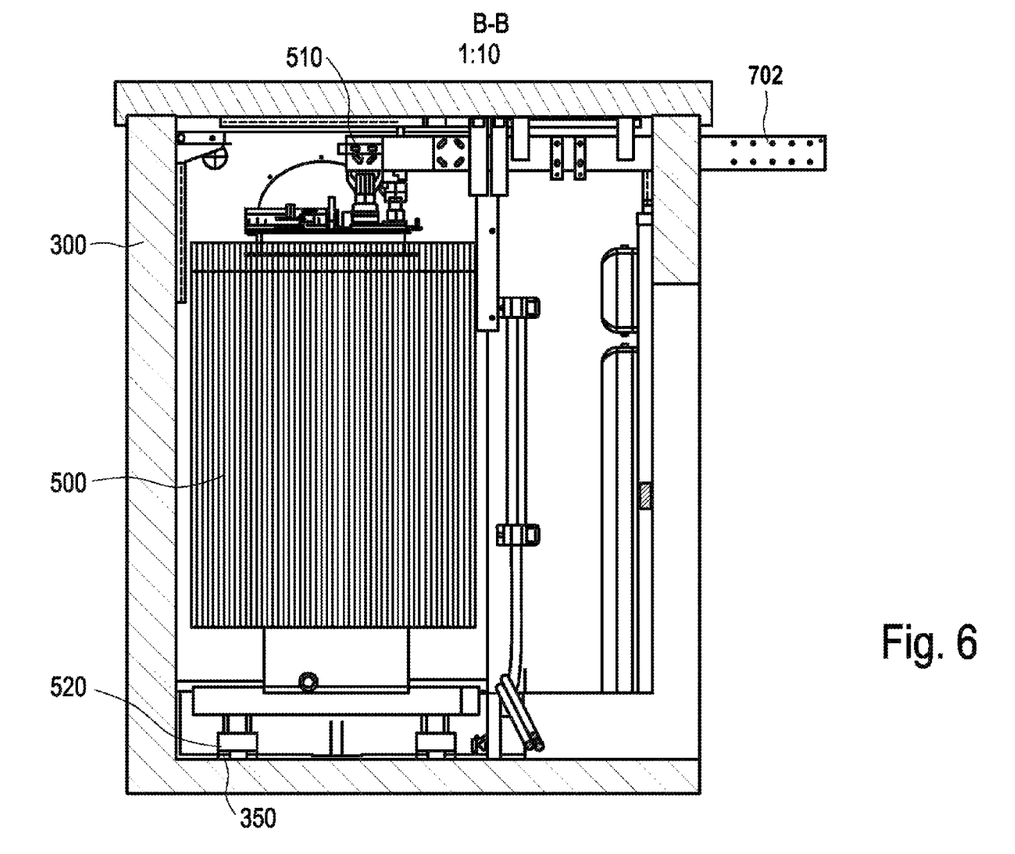

FIG. 6 shows a further sectional view of the fire protection module 300 of the third embodiment. Provided on the bottom of the fire protection module is a rail system 350 which can receive rollers 520 of a transformer 500. Provided at the top side of the transformer 500 are electric connections 510 which serve to be electrically coupled to a bus bar 700. The bus bar 700 then passes out of the fire protection module.

Figure 7:
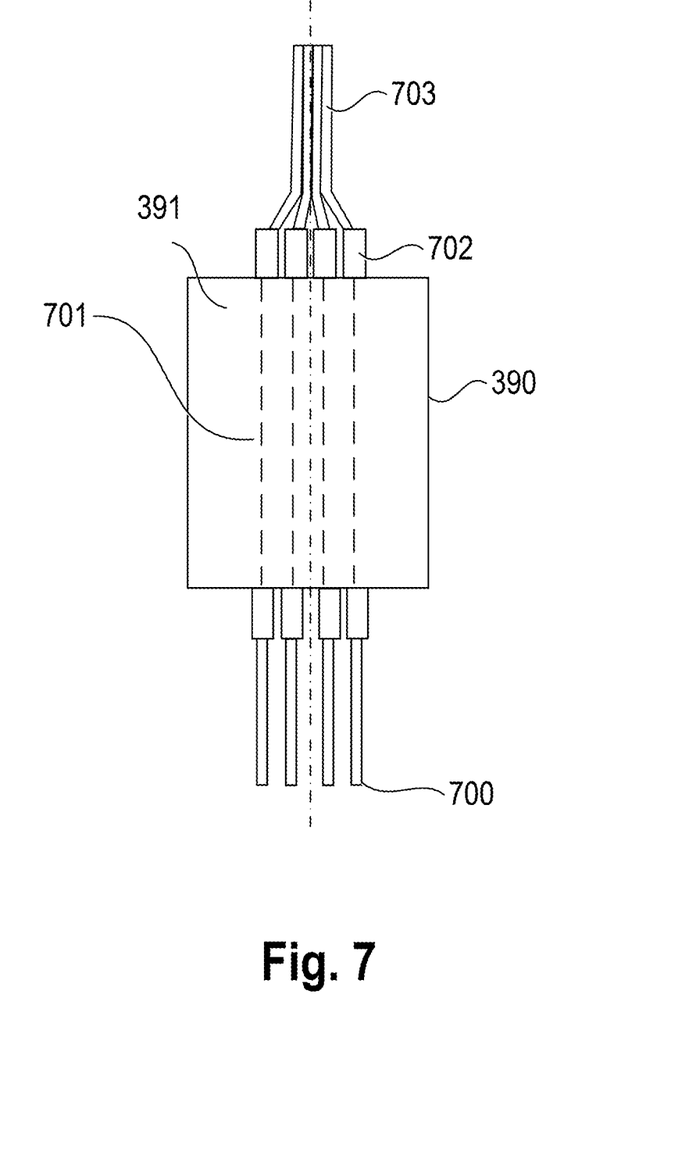
FIG. 7 shows a schematic representation of a fire protection termination of a fire protection module according to one embodiment of the invention.

FIG. 7 shows a schematic representation of a fire protection termination means of a fire protection module according to one embodiment of the invention. The fire protection termination means 340, 390 serves to pass the electric cables and/or the electric bus bar system 700 outwardly from the interior of the fire protection module. In this respect the fire protection termination means 340, 390 is of such a configuration that at least at times it can provide for thermal decoupling between the interior and the exterior of the fire protection module. That is achieved by the provision of a fire protection casting sealant 391 comprising a thermally insulating material in the region of the fire protection termination means 390. The material of the fire protection casting sealant 391 surrounds the electric cables and/or the electric bus bar system 700 and seals off the fire protection termination means 390. Thus the fire protection casting sealant 391 surrounds a portion 701 of the bus bar system which is passed through the fire protection termination means 390. A portion 702 of the bus bars 700 projects above or outside the fire protection module. The mutually spaced bus bars 701 are brought together or lie against each other in a portion 703.

The material of the fire protection casting sealant can represent, for example, Flammadur 430.

Optionally besides the two openings 102*e* and 102*f* a further opening can be provided in the pylon wall. A ventilation passage can be provided between the further opening and the fire protection module. That passage and the further opening serve in particular to dissipate outwardly an increased pressure caused, for example, by virtue of an explosion in the fire protection module. Preferably the height of the further opening is, for example, at least at the height of three meters above the ground. That can ensure that even if a person is in the proximity of the further opening that person is not injured by gases suddenly issuing from the further opening. The safety of the fire protection module can be further improved in that way.

In addition a fire extinguishing unit can optionally be provided within the fire protection module. That unit can serve to extinguish a fire occurring within the fire protection module.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wind power installation comprising:
a pylon having a lower pylon segment;
a precast concrete fire protection module located within the lower pylon segment;
a transformer transport securing system in the fire protection module; and
a transformer located within the fire protection module, the fire protection module being configured to protect the transformer during a fire, the transformer transport securing system coupling the transformer to the fire protection module, wherein the transformer transport securing system secures the transformer during a transport of the precast concrete fire protection module and the transformer into the lower pylon segment.

2. The wind power installation according to claim 1 wherein the fire protection module has a first opening for the transformer to pass through and a second opening for service personnel to pass through.

3. The wind power installation according to claim 1 wherein the fire protection module has at least one fire protection termination means for at least one of electric cables and an electric bus bar system to extend through.

4. The wind power installation according to claim 1 wherein the fire protection module has a transformer transport rail system.

5. The wind power installation according to claim 3 wherein at least one of the electric cables and the electric bus bar system are passed through the fire protection termination means and the fire protection termination means has a fire protection casting sealant comprising a thermally insulating material.

6. The wind power installation according to claim 1 wherein a passage is provided between the interior of the fire protection module and an opening in a wall of the lower pylon segment for reducing pressure within the fire protection module.

7. The wind power installation according to claim 5 wherein the fire protection module is thermally decoupled from the lower pylon segment.

8. The wind power installation according to claim 5 wherein the thermally insulating material assists in thermally decoupling the fire protection module from the lower pylon segment.

9. A method comprising:
placing a transformer in a fire protection module;
securing the transformer to the fire protection module; and
while the transformer is secured to the fire protection module, transporting the fire protection module and the transformer into a lower pylon segment of a wind power installation.

10. The method according to claim 9 wherein the fire protection module is made of concrete.

11. The method according to claim 9 wherein transporting comprises moving the fire protection module along guide rails that extend into the lower pylon segment of the wind power installation.

* * * * *